(12) United States Patent
Lin et al.

(10) Patent No.: US 12,484,050 B2
(45) Date of Patent: Nov. 25, 2025

(54) INFORMATION TRANSMISSION METHOD AND APPARATUS, AND DEVICES

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN); Wenhong Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 624 days.

(21) Appl. No.: 17/901,285

(22) Filed: Sep. 1, 2022

(65) Prior Publication Data

US 2022/0417967 A1 Dec. 29, 2022

Related U.S. Application Data

(63) Continuation of application No. PCT/CN2020/078670, filed on Mar. 10, 2020.

(51) Int. Cl.
 *H04W 72/1268* (2023.01)
 *H04L 5/00* (2006.01)
 *H04W 72/23* (2023.01)
 *H04W 72/54* (2023.01)

(52) U.S. Cl.
 CPC ....... *H04W 72/1268* (2013.01); *H04L 5/0053* (2013.01); *H04W 72/23* (2023.01); *H04W 72/54* (2023.01)

(58) Field of Classification Search
 CPC . H04W 72/1268; H04W 72/23; H04W 72/54; H04L 5/0053
 See application file for complete search history.

(56) References Cited

U.S. PATENT DOCUMENTS

2024/0049222 A1* 2/2024 Fu .......... H04L 5/0053

FOREIGN PATENT DOCUMENTS

| CN | 110798291 A | 2/2020 |
| CN | 110830213 A | 2/2020 |

OTHER PUBLICATIONS

The EESR of corresponding European application No. 20924867.3, dated Jun. 6, 2023.

(Continued)

*Primary Examiner* — Rhonda L Murphy
(74) *Attorney, Agent, or Firm* — Ladas & Parry LLP

(57) ABSTRACT

Embodiments of the present application provide an information transmission method and apparatus, and devices. The method includes: when a first uplink channel and multiple second uplink channels overlap in a time domain and the multiple second uplink channels include at least one third uplink channel, a terminal device transmits first uplink information through a fifth uplink channel if the at least one third uplink channel includes a fourth uplink channel, where the third uplink channel corresponds to at least one DCI, the fourth uplink channel and the first uplink channel meet a first timing constraint, the fifth uplink channel has a first relationship with the fourth uplink channel or the fifth uplink channel is obtained through the fourth uplink channel, and the multiple second uplink channels do not overlap each other in the time domain.

15 Claims, 8 Drawing Sheets

(56) References Cited

OTHER PUBLICATIONS

CATT, UL control enhancements for URLLC, R1-1902003, 3GPP TSG RAN WG1 Meeting #96, Athens, Greece, Feb. 25-Mar. 1, 2019.
International Search Report (ISR) dated Nov. 27, 2020 for Application No. PCT/CN2020/078670.
Intel Corporation, Remaining details on NR PUCCH, R1-1810755, 3GPP TSG RAN WGI Meeting #94bis, Chengdu, China, Oct. 12, 2018 (Oct. 12, 2018).
Vivo, Remaining issues on PUCCH, R1-1810370, 3GPP TSG RAN WGI Meeting #94bis, Chengdu, China, Oct. 12, 2018 (Oct. 12, 2018).
Intel Corporation, On multi-TRP/multi-panel transmission, R1-1904313, 3GPP TSG RAN WGI Meeting #96bis, Xi'an, China, Apr. 12, 2019 (Apr. 12, 2019).
The second office action of corresponding European application No. 20924867.3, dated Jan. 3, 2025.

* cited by examiner

INFORMATION TRANSMISSION METHOD AND APPARATUS, AND DEVICES

CROSS-REFERENCE TO RELATED APPLICATIONS

This application is a continuation of the International Application No. PCT/CN2020/078670, filed on Mar. 10, 2020, entitled "INFORMATION TRANSMISSION METHOD, APPARATUS AND DEVICE", the content of which is incorporated herein by reference in its entirety.

TECHNICAL FIELD

Embodiments of the present application relate to the field of communication technologies and, in particular, to an information transmission method and apparatus, and devices.

BACKGROUND

In new radio (NR) standard Rel-15, when multiple physical uplink channels in a slot overlap in the time domain, if the multiple physical uplink channels meet a timing constraint of multiplexing, a terminal device multiplexes all the uplink control information (UCI) to a physical uplink control channel (PUCCH) resource for transmission.

In the NR standard Rel-15, ultra-reliable low latency communication (URLLC) services are supported. The URLLC services are characterized in that data packet generation is bursty and random, yielding high requirements on latency. In order to meet the latency requirements of URLLC, in NR standard Rel-16, a sub-slot based PUCCH is allowed to transmit acknowledgment/negative acknowledgment (ACK/NACK) information. In the NR standard Rel-16, when a sub-slot based PUCCH and a slot based PUCCH overlap in the time domain according to the working mechanism of Rel-15, a terminal device multiplexes all the UCI information to a PUCCH resource for transmission if a timing constraint of multiplexing is met, and the PUCCH resource is the sub-slot based PUCCH, that is, all the UCI information is subjected to multiplex transmission through the sub-slot based PUCCH. On the one hand, since the sub-slot to which the PUCCH resource belongs and other sub-slot based PUCCHs may not overlap in the time domain, it is easy to increase a feedback delay; or, on the other hand, the multiplexing of all the UCI information to the PUCCH resource results in a large UCI information capacity in the PUCCH, which will affect reliability of transmission.

SUMMARY

The embodiments of the present application provide an information transmission method and apparatus, and devices.

In a first aspect, an embodiment of the present application provides an information transmission method applied to a terminal device, and the method includes:

when a first uplink channel and multiple second uplink channels overlap in a time domain and the multiple second uplink channels include at least one third uplink channel, transmitting first uplink information through a fifth uplink channel if the at least one third uplink channel includes a fourth uplink channel, where the third uplink channel corresponds to at least one downlink control signaling DCI, the fourth uplink channel and the first uplink channel meet a first timing constraint, the fifth uplink channel has a first relationship with the fourth uplink channel, and the multiple second uplink channels do not overlap each other in the time domain.

In a second aspect, an embodiment of the present application provides another information transmission method applied to a terminal device, and the method includes:

when a first uplink channel and multiple second uplink channels overlap in a time domain and the multiple second uplink channels are configured by higher layer signaling, transmitting second uplink information through a sixth uplink channel if the first uplink channel and the multiple second uplink channels meet a second timing constraint; or, transmitting the multiple second uplink channels if the first uplink channel and the multiple second uplink channels do not meet the second timing constraint, where the multiple second uplink channels do not overlap each other in the time domain.

In a third aspect, an embodiment of the present application provides an information transmission method applied to a network device, and the method includes:

when a first uplink channel and multiple second uplink channels overlap in a time domain and the multiple second uplink channels include at least one third uplink channel, receiving first uplink information through a fifth uplink channel if the at least one third uplink channel includes a fourth uplink channel, where the third uplink channel corresponds to at least one downlink control signaling DCI, the fourth uplink channel and the first uplink channel meet a first timing constraint, the fifth uplink channel has a first relationship with the fourth uplink channel, and the multiple second uplink channels do not overlap each other in the time domain.

In a fourth aspect, an embodiment of the present application provides another information transmission method applied to a network device, and the method includes:

when a first uplink channel and multiple second uplink channels overlap in a time domain and the multiple second uplink channels are configured by higher layer signaling, receiving second uplink information through a sixth uplink channel if the first uplink channel and the multiple second uplink channels meet a second timing constraint; or, receiving information through the multiple second uplink channels if the first uplink channel and the multiple second uplink channels do not meet the second timing constraint, where the multiple second uplink channels do not overlap each other in the time domain.

In a fifth aspect, an embodiment of the present application provides an information transmission apparatus applied to a terminal device, and the apparatus includes:

a sending module configured to, when a first uplink channel and multiple second uplink channels overlap in a time domain and the multiple second uplink channels include at least one third uplink channel, transmit first uplink information through a fifth uplink channel if the at least one third uplink channel includes a fourth uplink channel, where the third uplink channel corresponds to at least one downlink control signaling DCI, the fourth uplink channel and the first uplink channel meet a first timing constraint, the fifth uplink channel has a first relationship with the fourth uplink channel, and the multiple second uplink channels do not overlap each other in the time domain.

In a sixth aspect, an embodiment of the present application provides another information transmission apparatus applied to a terminal device, and the apparatus includes:

a first sending module configured to, when a first uplink channel and multiple second uplink channels overlap in a time domain and the multiple second uplink channels are configured by higher layer signaling, transmit second uplink information through a sixth uplink channel if the first uplink channel and the multiple second uplink channels meet a second timing constraint; or, a second sending module configured to, transmit the multiple second uplink channels if the first uplink channel and the multiple second uplink channels do not meet the second timing constraint, where the multiple second uplink channels do not overlap each other in the time domain.

In a seventh aspect, an embodiment of the present application provides an information transmission apparatus applied to a network device, and the apparatus includes:

a receiving module configured to, when a first uplink channel and multiple second uplink channels overlap in a time domain and the multiple second uplink channels include at least one third uplink channel, receive first uplink information through a fifth uplink channel if the at least one third uplink channel includes a fourth uplink channel, where the third uplink channel corresponds to at least one downlink control signaling DCI, the fourth uplink channel and the first uplink channel meet a first timing constraint, the fifth uplink channel has a first relationship with the fourth uplink channel, and the multiple second uplink channels do not overlap each other in the time domain.

In an eighth aspect, an embodiment of the present application provides another information transmission apparatus applied to a network device, and the apparatus includes:

a receiving module configured to, when a first uplink channel and multiple second uplink channels overlap in a time domain and the multiple second uplink channels are configured by higher layer signaling, receive second uplink information through a sixth uplink channel if the first uplink channel and the multiple second uplink channels meet a second timing constraint; or, receive information from the multiple second uplink channels if the first uplink channel and the multiple second uplink channels do not meet the second timing constraint, where the multiple second uplink channels do not overlap each other in the time domain.

In a ninth aspect, an embodiment of the present application provides a terminal device, including:

a processor, a memory, a transmitter, and an interface for communication with a network device;

where the memory stores computer-executable instructions;

the processor executes the computer-executable instructions stored in the memory, so that the processor executes the information transmission method provided in any one of the first aspect or the second aspect.

In a tenth aspect, an embodiment of the present application provides a network device, including:

a processor, a memory, a receiver, and an interface for communication with a terminal device;

where the memory stores computer-executable instructions;

the processor executes the computer-executable instructions stored in the memory, so that the processor executes the information transmission method provided in any one of the third aspect or the fourth aspect.

In an implementation, the above-mentioned processor may be a chip.

In an eleventh aspect, an embodiment of the present application may provide a computer-readable storage medium. Computer-executable instructions are stored in the computer-readable storage medium, and the computer-executable instructions, when executed by a processor, are used to implement the information transmission method provided in any one of the first aspect or the second aspect.

In a twelfth aspect, an embodiment of the present application may provide a computer-readable storage medium. Computer-executable instructions are stored in the computer-readable storage medium, and the computer-executable instructions, when executed by a processor, are used to implement the information transmission method provided in any one of the third aspect or the fourth aspect.

In a thirteenth aspect, an embodiment of the present application provides a program which, when executed by a processor, is used to execute the information transmission method provided in any one of the first aspect or the second aspect.

In a fourteenth aspect, an embodiment of the present application provides a program which, when executed by a processor, is used to execute the information transmission method provided in any one of the third aspect or the fourth aspect.

In a fifteenth aspect, an embodiment of the present application provides a computer program product including program instructions, where the program instructions are used to implement the information transmission method provided in any one of the first aspect or the second aspect.

In a sixteenth aspect, an embodiment of the present application provides a computer program product including program instructions, where the program instructions are used to implement the information transmission method provided in any one of the third aspect or the fourth aspect.

In a seventeenth aspect, an embodiment of the present application provides a chip, including: a processing module and a communication interface, where the processing module can execute the information transmission method provided in any one of the first aspect or the second aspect.

Further, the chip further includes a storage module (e.g., a memory), the storage module is configured to store instructions, the processing module is configured to execute the instructions stored in the storage module, and the execution of the instructions stored in the storage module causes the processing module to execute the information transmission method provided in any one of the first aspect or the second aspect.

In an eighteenth aspect, an embodiment of the present application provides a chip, including: a processing module and a communication interface, where the processing module can execute the information transmission method provided in any one of the first aspect or the second aspect.

Further, the chip further includes a storage module (e.g., a memory), the storage module is configured to store instructions, the processing module is configured to execute the instructions stored in the storage module, and the execution of the instructions stored in the storage module causes the processing module to execute the information transmission method provided in any one of the third aspect or the fourth aspect.

In the information transmission method and apparatus, and devices provided in the embodiments of the present application, when a first uplink channel and multiple second uplink channels overlap in a time domain, a terminal device determines, from the multiple second uplink channels, a fourth uplink channel that meets a timing constraint, and transmits uplink information that is about to multiplex transmission through a fifth uplink channel determined from a time unit or DCI corresponding to the fourth uplink channel, where the multiple second uplink channels do not overlap each other in the time domain.

BRIEF DESCRIPTION OF DRAWINGS

In order to more clearly illustrate the embodiments of the present application or the technical solutions in the related art, the following will briefly introduce the accompanying drawings used in the description of the embodiments or the related art. Obviously, the drawings in the following description are some embodiments of the present application. For those of ordinary skill in the art, other drawings can also be obtained from these drawings without any creative effort.

DESCRIPTION OF EMBODIMENTS

In order to describe the objectives, technical solutions and advantages of the embodiments of the present application more clearly, the technical solutions in the embodiments of the present application will be described clearly and comprehensively below with reference to the drawings in the embodiments of the present application. Obviously, the described embodiments are some, but not all, embodiments of the present application. Based on the embodiments in the present application, all other embodiments obtained by those of ordinary skill in the art without creative efforts shall fall within the protection scope of the present application.

The terms "first", "second" and the like in the description, claims and the above-mentioned drawings of the embodiments of the present application are used to distinguish similar objects, and are not necessarily used to describe a specific sequence or order. It is to be understood that the data so used may be interchanged under appropriate circumstances such that the embodiments of the present application described herein can, for example, be practiced in sequences other than those illustrated or described herein. Furthermore, the terms "including" and "having", and any variations thereof, are intended to cover non-exclusive inclusion, for example, processes, methods, systems, products or devices including a series of steps or units are not necessarily limited to those expressly listed, rather, they may include other steps or units not expressly listed or inherent to these processes, methods, products or devices.

It should be understood that the terms "system" and "network" are often used interchangeably herein. The term "and/or" herein is only an association relationship to describe associated objects, indicating that there can be three kinds of relationships, for example, A and/or B, it can mean three cases: A exists alone, A and B exist at the same time, and B exists alone. In addition, the character "/" herein generally indicates that contextually associated objects are in an "or" relationship.

The technical solutions in the embodiments of the present application will be described below with reference to the accompanying drawings. Obviously, the described embodiments are part of the embodiments of the present application, but not all of the embodiments. Based on the embodiments in the present application, all other embodiments obtained by those of ordinary skill in the art without creative efforts shall fall within the protection scope of the present application.

Figure 1:
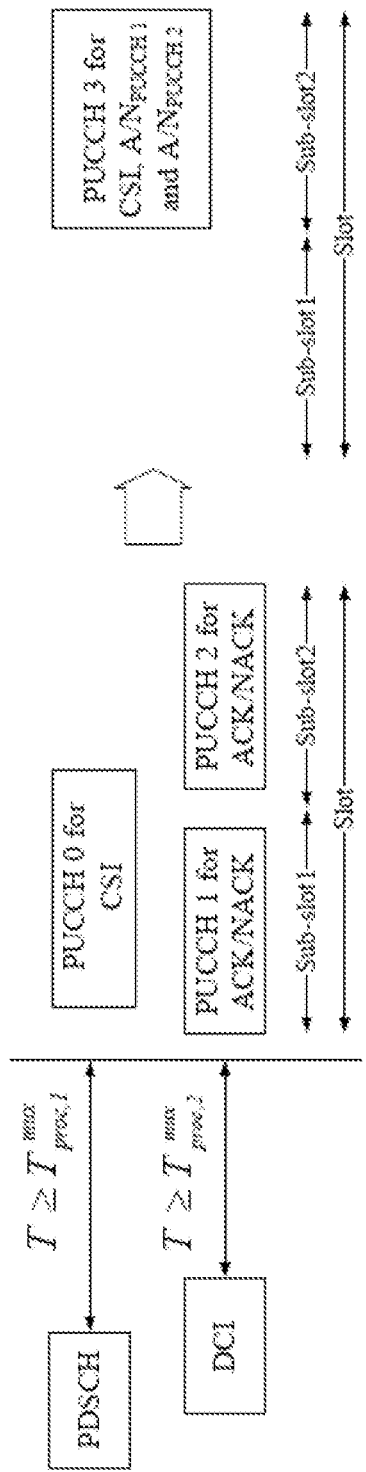
FIG. 1 is a schematic diagram of subjecting all the UCI to multiplex transmission on one PUCCH in a technical solution.

In the NR standard Rel-15, when multiple physical uplink channels in a time unit such as a slot overlap in the time domain, a terminal device first determines whether the multiple physical uplink channels meet a timing constraint of multiplexing. If the timing constraint of multiplexing is met, the terminal device multiplexes all the UCI to one PUCCH resource for transmission. Specifically, FIG. 1 is a schematic diagram of subjecting all the UCI to multiplex transmission on one PUCCH in a technical solution. As shown in FIG. 1, PUCCH 0 is a slot based PUCCH; PUCCH 1 and PUCCH 2 are sub-slot based PUCCHs; the multiplexing channel is PUCCH 3, and PUCCH 3 does not overlap with the original PUCCH 1 in the time domain, but there is still a requirement that the ACK/NACK information in PUCCH 1 should be multiplexed to PUCCH 3 for transmission. In the technical solution of FIG. 1, on the one hand, the feedback delay of PUCCH 1 is increased; and/or, on the other hand, the UCI capacity in PUCCH 3 is relatively large, which will affect the reliability of transmission.

Further, it is stipulated in the NR standard Rel-15 that when multiple PUCCHs overlap in the time domain or when a PUCCH and a physical uplink shared channel (PUSCH) overlap in the time domain, multiplex transmission is possible only if a timing constraint is met. Otherwise, the terminal device will determine this situation as an abnormal situation. The timing constraint here is mainly to ensure that the terminal device has enough time to determine whether the information carried by different uplink channels needs to be multiplexed, and the time required for UCI concatenation and coding and the like during multiplex transmission.

Figure 2:
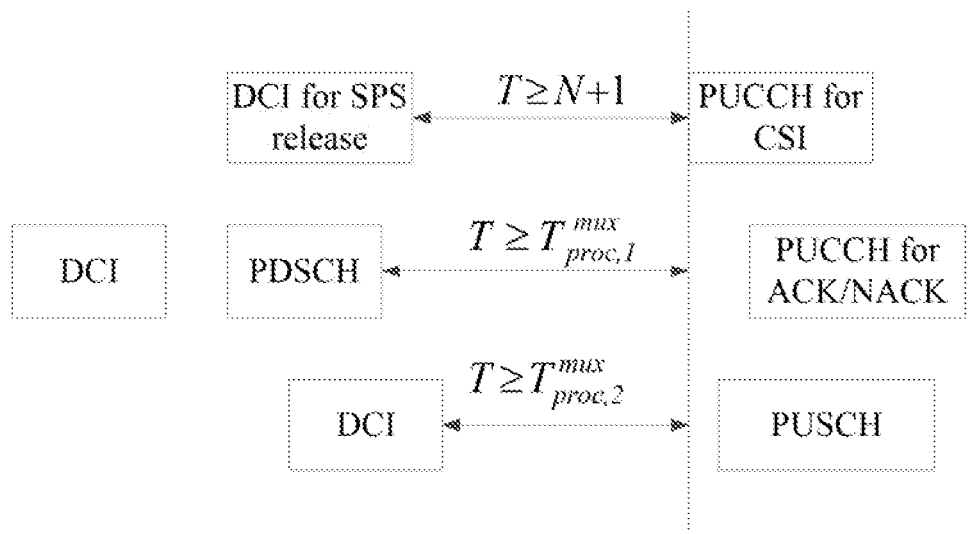
FIG. 2 is a schematic diagram of a timing constraint of multiplexing in a technical solution.

FIG. 2 is a schematic diagram of a timing constraint of multiplexing in a technical solution. Referring to FIG. 2, the timing constraint may include one or more of the following conditions (1) to (4):

(1) When there is a channel carrying ACK/NACK information in overlapping channels, a time difference between the first time-domain symbol of the earliest transmitted channel in the overlapping channels and the last time-domain symbol of a PDSCH corresponding to the ACK/NACK information is not less than $T_{proc,1}^{mux} N_1 + d_{1,1} + 1$ time domain symbols, where $T_{proc,1}^{mux}$ is the time difference; $N_1$ is the processing time of the PDSCH, which is determined according to information on processing capability reported by the terminal device; and the value of $d_{1,1}$ is specified by the protocol and is related to the PDSCH resource allocation.

(2) When there is a channel in the overlapping channels that carries ACK/NACK information corresponding to DCI indicating the semi-persistent schedule (SPS) PDSCH release, a time difference between the first time domain symbol of the earliest transmitted channel in the overlapping channels and the last time domain symbol of a PDCCH carrying the DCI for the SPS PDSCH release is not less than $T_{proc,release}^{mux} = N+1$ time domain symbols, where $T_{proc,release}^{mux}$ is the time difference, the value of N is specified by the protocol and is related to the processing capability reported by the terminal and the size of the subcarrier spacing.

(3) When there is a PUSCH in the overlapping channels and there is no aperiodic CSI reporting in the PUSCH, a time difference between the first time-domain symbol of the earliest transmitted channel in the overlapping channels and the last time-domain symbol of a target PDCCH is not less than $T_{proc,2}^{mux} = N_2 + d_{2,1} + 1$ time domain symbols, where $T_{proc,2}^{mux}$ is the time difference: $N_2$ is the processing time of the PUSCH, which is determined according to information on processing capability reported by the terminal device; the value of $d_{2,1}$ is specified by the protocol. The target PDCCHs comprise the following: (1) a PDCCH carrying DCI for scheduling the PUSCH; and (2) a PDCCH for scheduling a PDSCH or indicating the SPS PDSCH release, and corresponding ACK/NACK information for the scheduled PDSCH or indicating the SPS PDSCH release is transmitted over a PUCCH in the overlapping channels.

(4) When there is a PUSCH in the overlapping channels, and there is aperiodic CSI reporting in the PUSCH, a time difference between the first time-domain symbol of the earliest transmitted channel in the overlapping channels and the last time-domain symbol of a PDCCH is not less than $T_{pro,CSI}^{mux} = Z + d$ time domain symbols, where $T_{pro,CSI}^{mux}$ is the time difference; Z is the CSI calculation time, which is determined according to information on processing capability reported by the terminal device; and the value of d is specified by the protocol.

Figure 3:
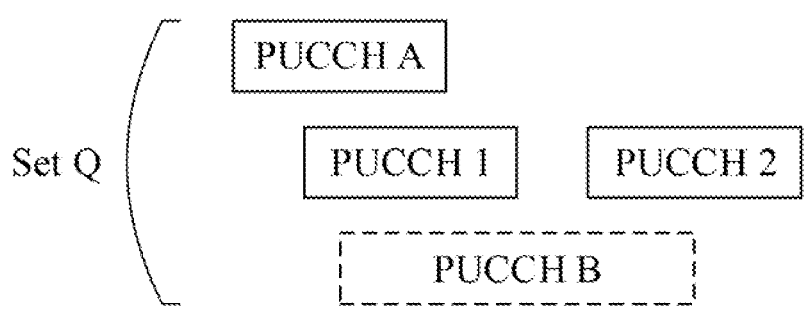
FIG. 3 is a schematic diagram of determining a set of overlapping PUCCH channels in a technical solution.

FIG. 3 is a schematic diagram of determining a set of overlapping PUCCH channels in a technical solution.

Referring to FIG. 3, a set of overlapping PUCCH channels in one time unit may be determined by the following steps, for example, determining multiple second PUCCHs overlapping with a first PUCCH:

Step 1: Determine PUCCH A, where PUCCH A is a PUCCH with the earliest start symbol in the overlapping channels. If there are multiple PUCCHs with the same start symbol, the PUCCH with the longest duration is selected as PUCCH A. If two PUCCHs are the same in terms of the start symbol and duration, choose either one of them.

Step 2: Incorporate a PUCCH overlapping with PUCCH A into set Q.

Step 3: Incorporate a PUCCH overlapping with any PUCCH in the set Q into the set Q.

Step 4: Multiplex all the UCI in the set Q to one PUCCH, and determine PUCCH B according to the number of bits of the UCI and a PUCCH resource indicator PRI (PRI) in DCI.

Step 5, determine whether PUCCH B overlaps with other PUCCHs. If so, repeat the execution of steps 1 to 4.

Based on the above content, an embodiment of the present application provides an information transmission method. When a first uplink channel and multiple second uplink channels overlap in a time domain, transmit first uplink information through a fifth uplink channel if the multiple second uplink channels include at least one third uplink channel and the at least one third uplink channel includes a fourth uplink channel, where the third uplink channel corresponds to at least one DCI, the fourth uplink channel and the first uplink channel meet a first timing constraint, the multiple second uplink channels do not overlap each other in the time domain, the fifth uplink channel and the fourth uplink channel occupy the same time unit, or the fifth uplink channel and the fourth uplink channel correspond to the first DCI.

Based on the technical solutions of the embodiments of the present application, when a first uplink channel and multiple second uplink channels overlap in a time domain, a terminal device determines a fourth uplink channel from the multiple second uplink channels that meets a timing constraint, and transmits uplink information that is about to multiplex transmission through a fifth uplink channel determined from a time unit or DCI corresponding to the fourth uplink channel, where the multiple second uplink channels do not overlap each other in the time domain. On the one hand, the fourth uplink channel that meets a timing constraint is determined from the second uplink channels and the uplink information is transmitted through the fifth uplink channel determined from the time unit or the DC corresponding to the fourth uplink channel, which can limit the channel for multiplexed transmission to one second uplink channel, and avoid multiplexing feedback information on multiple second uplink channels to the same uplink channel for transmission, thereby the feedback delay can be reduced and/or the reliability of data transmission can be improved.

The technical solutions of the embodiments of the present application can be applied to various communication systems, for example, a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), wireless fidelity WiFi), an NTN communication system, a next-generation communication system or other communication systems, etc.

Generally speaking, traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), and vehicle to vehicle (V2V) communication, device to satellite communication, etc., the technical solutions of the embodiments of the present application can also be applied to these communication systems.

Figure 4:
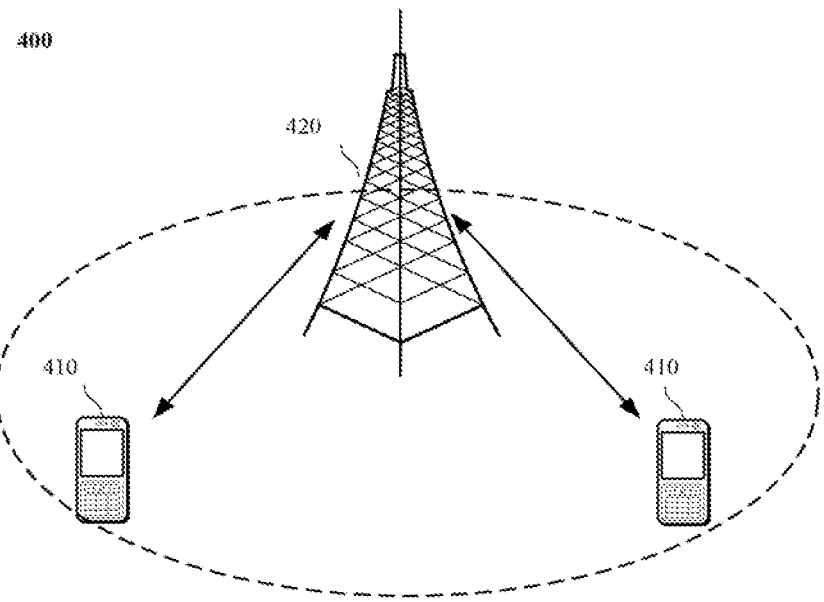
FIG. 4 is a schematic diagram of a communication system to which an embodiment of the present application is applied.

FIG. 4 is a schematic diagram of a communication system to which an embodiment of the present application is applied. As shown in FIG. 4, the communication system 400 may include terminal devices 410 and a network device 420. The terminal devices 410 include, but are not limited to, devices that communicate via wired lines, such as devices that communicate via public switched telephone networks (PSTN), digital subscriber lines (DSL), digital cables, and direct cable connections; and/or devices that communicate via wireless interfaces, such as for cellular networks, Wireless Local Area Networks (WLAN), digital television networks such as DVB-H networks, satellite networks. Amplitude Modulation-Frequency Modulation (AM-FM) broadcast transmitters; and/or devices of another terminal device that are configured to receive/send communication signals; and/or internet of things (IoT) devices. A terminal device arranged to perform communications via a wireless interface may be referred to as a "wireless communication terminal", a "wireless terminal" or a "mobile terminal". Examples of the mobile terminal include, but are not limited to, satellites or cellular telephones; personal communications system (PCS) terminals that may combine cellular radio telephones with data processing, facsimile, and data communications capabilities; personal digital assistant (PDA) that may include radio telephones, pagers. Internet/Intranet access, web browsers, memo pads, calendars, and/or global positioning system (GPS) receivers; and conventional laptop and/or palmtop receiver or other electronic device including a radiotelephone transceiver. The terminal device may refer to an access terminal, user equipment (UE), a subscriber unit, a subscriber station, a mobile station, a mobile, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a PDA, a wireless-enabled handheld device, a computing device, or other processing device connected to a wireless modem, an in-vehicle device, a wearable device, a terminal device in a 5G network or a terminal device in a future evolved PLMN, etc.

The network device 420 may provide communication coverage for a particular geographic area, and may communicate with the terminal devices 410 located within the coverage area. In an implementation, the network device 420 may be a base station (BTS) in the GSM system or the CDMA system, a base station (NB) in the WCDMA system, or an evolved base station (eNB or eNodeB) in the LTE system, or a wireless controller in a cloud radio access network (CRAN), or a satellite in a non terrestrial network (NTN); alternatively, the network device may be a mobile switching center, a relay station, an access point, an in-vehicle device, a wearable device, a hub, a switch, a network bridge, a router, a network device in the 5G network, or a network device in the future evolved public land mobile network (PLMN), etc.

In an implementation, D2D communication may be performed between the terminal devices 410, that is, the technical solution provided in the present application may also be applied to the communication between two terminal devices.

In an implementation, the 5G system or the 5G network may also be referred to as a new radio (NR) system or an NR network.

FIG. 4 exemplarily shows one network device and two terminal devices. In an implementation, the communication system 400 may include multiple network devices and each network device may include other numbers of terminal devices within its coverage, which is not limited in the embodiment of the present application.

In an implementation, the communication system 400 may further include other network entities such as a network controller and a mobility management entity, which is not limited in the embodiment of the present application.

The information transmission method provided in the present application will be described in detail below through several specific embodiments.

Figure 5:
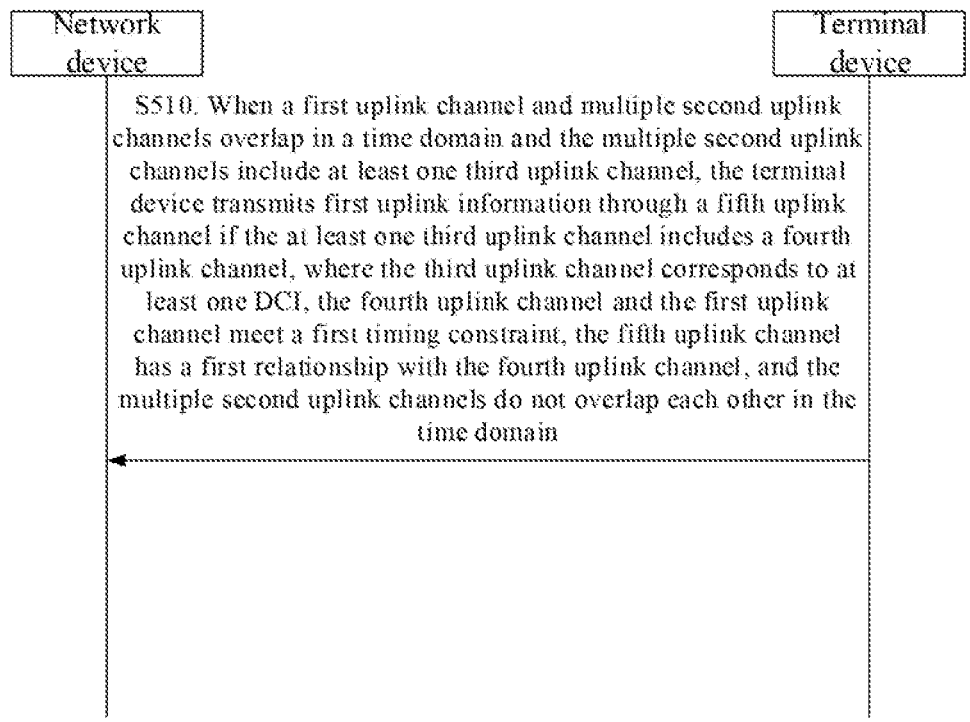
FIG. 5 is a schematic flowchart of a first embodiment of an information transmission method according to embodiment of the present application.

In the related art, the multiplexing of all the UCI information to one PUCCH resource for transmission may easily cause a problem of increased feedback delay and/or reduced transmission reliability. FIG. 5 is a schematic flowchart of a first embodiment of an information transmission method according to an embodiment of the present application, which is used to solve the problem that in the related art, since all UCI information is multiplexed to one PUCCH resource for transmission, it is easy to cause increased feedback delay and/or reduced transmission reliability. As shown in FIG. 5, the information transmission method can be applied to a terminal device, and specifically includes the following steps.

Step S510: when a first uplink channel and multiple second uplink channels overlap in a time domain and the multiple second uplink channels include at least one third uplink channel, the terminal device transmits first uplink information through a fifth uplink channel if the at least one third uplink channel includes a fourth uplink channel, where the third uplink channel corresponds to at least one DCI, the fourth uplink channel and the first uplink channel meet a first timing constraint, the fifth uplink channel has a first relationship with the fourth uplink channel or the fifth uplink channel is obtained through the fourth uplink channel, and the multiple second uplink channels do not overlap each other in the time domain.

In an example embodiment, the first uplink channel is a PUCCH for transmitting channel state information (CSI) or for transmitting a scheduling request (SR), and the second uplink channel is a PUCCH for transmitting ACK/NACK information. For example, the first uplink channel may be a slot based PUCCH, the second uplink channel may be a sub-slot based PUCCH, and the first uplink channel overlaps with each of the second uplink channels in the time domain.

It should be noted that in the example embodiment, the first uplink channel may also be other appropriate uplink channels. For example, the first uplink channel can be an uplink channel having no corresponding DCI or an uplink channel configured by higher layer signaling, which is also within the protection scope of the present application.

In an example embodiment, the multiple second uplink channels include at least one third uplink channel, and the third uplink channel corresponds to at least one DCI. Further, the third uplink channel corresponding to at least one DCI may include: the at least one DCI being used to trigger the third uplink channel for transmission; or, the at least one DCI being used to schedule the third uplink channel for transmission; or, the at least one DCI being used to indicate a resource of the third uplink channel.

Further, the first timing constraint includes: a time interval between a target start position and a first downlink channel being not less than a first value, where the target start position is the earliest start position between the third uplink channel and the first uplink channel, and uplink information corresponding to the first downlink channel is transmitted through the third uplink channel. For example, if the third uplink channel is PUCCH 2, the first downlink channel is PDSCH 2. Specifically, if the start position of the first uplink channel is earlier than the start position of the third uplink channel, the first timing constraint includes: a time interval between the start position of the first uplink channel and the first downlink channel being not less than the first value; if the start position of the third uplink channel is earlier than the start position of the first uplink channel, the first timing constraint includes a time interval between the start position of the third uplink channel and the first downlink channel being not less than the first value.

It should be noted that the first timing constraint is not limited to this, but may also include other appropriate timing constraints, such as one or more of the above timing constraints (1) to (4), which is also within the protection scope of the present application.

Further, in some embodiments, the fifth uplink channel and the fourth uplink channel have a first relationship. Specifically, the fifth uplink channel and the fourth uplink channel have one or more of the following relationships: the fifth uplink channel and the fourth uplink channel occupy the same time unit, which is one of a slot, a sub-slot and at least one time domain symbol; the fifth uplink channel and the fourth uplink channel correspond to first DCI. For example, the fifth uplink channel is determined according to the first DCI and the number of bits of the first uplink information, where the number of bits of the first uplink information includes the number of bits of uplink information carried in the first uplink channel and the number of bits of uplink information carried in the fourth uplink channel. The first DCI is the last DCI in at least one DCI corresponding to the fourth uplink channel, and the last DCI is the latest DCI in the time domain of the at least one DCI.

Specifically, the terminal device determines a set of PUCCH resources according to the number of bits of the first uplink information, and then obtains a corresponding PUCCH resource, that is, the fifth uplink channel, from the set of PUCCH resources according to the indication of an information field of a PUCCH resource indicator (PRI) in the first DCI.

In other embodiments, the fifth uplink channel is obtained through the fourth uplink channel, for example, the fifth uplink channel is determined according to the time unit corresponding to the fourth uplink channel, and/or the fifth uplink channel is determined according to an information filed of a PUCCH PRI of the last DCI in at least one DCI corresponding to the fourth uplink channel.

Further, in an example embodiment, the terminal device transmits the first uplink information to a network device through the fifth uplink channel. The first uplink information includes: part or all of uplink information carried in the fourth uplink channel; or, part or all of uplink information carried in the fourth uplink channel and part or all of uplink information carried in the first uplink channel.

According to the technical solution in the example embodiment of FIG. 5, when a first uplink channel overlaps with multiple second uplink channels in a time domain, a terminal device determines from the multiple second uplink channels a fourth uplink channel that meets a timing constraint, and transmits uplink information that is about to multiplex transmission through a fifth uplink channel determined from a time unit or DCI corresponding to the fourth uplink channel, where the multiple second uplink channels do not overlap each other in the time domain. On the one hand, the fourth uplink channel that meets a timing constraint is determined from the second uplink channels, and the uplink information is transmitted through the fifth uplink channel determined from the time unit or the DCI corresponding to the fourth uplink channel, which can limit the channel for multiplex transmission to one second uplink channel and avoid multiplexing the feedback information on multiple second uplink channels to the same uplink channel for transmission, thereby the feedback delay can be reduced and/or the reliability of data transmission can be improved.

In addition, in an example embodiment, if the above at least one third uplink channel does not include the fourth uplink channel, the multiple second uplink channels are transmitted. In this example embodiment, the first uplink channel may or may not be transmitted. If the first uplink channel is not transmitted, the terminal device can automatically abandon transmitting CSI information that has a relatively small impact on performance, so as to ensure the reliable transmission of ACK/NACK information without excessive limitations on the scheduling of the network device.

Further, in an example embodiment, when a PUCCH carrying ACK/NACK information (i.e., the sub-slot based PUCCH) scheduled/triggered by downlink control information (DCI) overlaps with a PUCCH carrying CSI or an SR (i.e., the slot based PUCCH), the resources of the multiplexed channel are determined according to the total number of bits of the multiplexed UCI and the PRI indicated in the last DCI information corresponding to the ACK/NACK. When a PUCCH carrying ACK/NACK information without DCI scheduling/triggering (i.e. configured by higher layer signaling) overlaps with a PUCCH carrying an SR or CSI, the PUCCH for transmitting the CSI configured by the higher layer signaling is used to multiplex all the UCI information.

Figure 6:
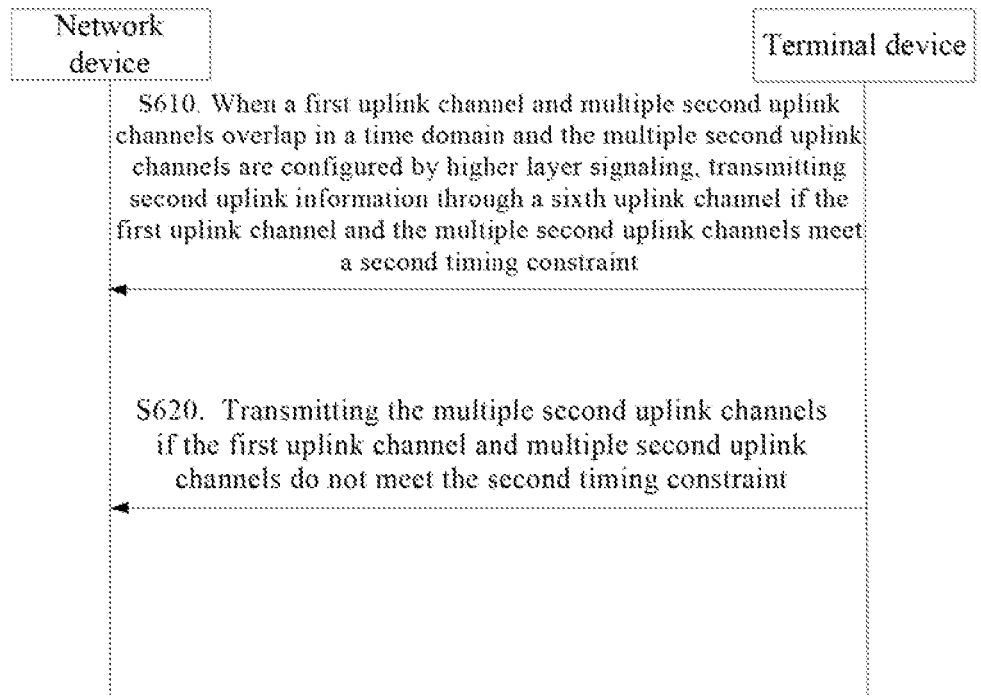
FIG. 6 is a schematic flowchart of a second embodiment of an information transmission method according to an embodiment of the present application.

FIG. 6 is a schematic flowchart of a second embodiment of an information transmission method according to an embodiment of the present application. As shown in FIG. 6, the information transmission method can be applied to a terminal device, and specifically includes the following steps:

Step S610, when a first uplink channel and multiple second uplink channels overlap in a time domain and the multiple second uplink channels are configured by higher layer signaling, transmitting second uplink information through a sixth uplink channel if the first uplink channel and the multiple second uplink channels meet a second timing constraint.

In an example embodiment, the first uplink channel is a PUCCH for transmitting CSI or for transmitting a SR, and the second uplink channel is a PUCCH for transmitting ACK/NACK information or a PUCCH configured for higher layer signaling. For example, the first uplink channel may be a slot based PUCCH, the second uplink channel may be a sub-slot based PUCCH, and the first uplink channel overlaps with each of the second uplink channels in the time domain.

It should be noted that in the example embodiment, the first uplink channel can also be other appropriate uplink channels. For example, the first uplink channel may be an uplink channel having no corresponding DCI or an uplink channel configured by higher layer signaling, which is also within the protection scope of the present application.

In the example embodiment, the second timing constraint includes: a time interval between a target start position and multiple second downlink channels, such as end positions of the second downlink channels, being not less than a first value, where the target start position is the earliest start position among the first uplink channel and the multiple second uplink channels, and uplink information corresponding to the second downlink channel is transmitted through the second uplink channel, for example, if the second uplink channel is PUCCH 2, the second downlink channel is PDSCH 2.

It should be noted that the second timing constraint is not limited to this, but may also include other appropriate timing constraints, such as one or more of the above timing constraints (1) to (4), which is also within the protection scope of the present application.

Further, in an example embodiment, the second uplink information includes part or all of information carried by the first uplink channel and information carried by the multiple second uplink channels. According to the technical solution in the embodiment, since in the technical solution it cannot be guaranteed that PUCCHs selected for multiplex transmission belong to the same sub-slot, multiplexing all the UCI to one PUCCH such as a slot based PUCCH for transmission can avoid the missing of UCI information and thus can improve the transmission reliability of the communication system.

Step S620, if the first uplink channel and the multiple second uplink channels do not meet the second timing constraint, transmit the multiple second uplink channels.

In an example embodiment, if the first uplink channel and the multiple second uplink channels do not meet the second timing constraint, the multiple second uplink channels may be transmitted without transmitting the first uplink channel. According to the technical solution of the embodiment, the terminal device can automatically abandon transmitting CSI information that has a relatively small impact on performance, so as to ensure the reliable transmission of ACK/NACK information without excessive limitations on the scheduling of the network device.

Further, in an example embodiment, the sixth uplink channel is configured to transmit third uplink information, the first uplink channel is configured to transmit the third uplink information, the third uplink information is CSI information, and the first uplink channel is configured to transmit the CSI information. In some embodiments, the sixth uplink channel may also be the first uplink channel.

In addition, in an example embodiment, the sixth uplink channel is one of at least one PUCCH for physical uplink control channel PUCCH resources configured by the higher layer signaling, for example, the sixth uplink channel is one PUCCH of at least one PUCCH configured by higher layer signaling multi-CSI-PUCCH-ResoureList or pucch-CSI-ResourceList; alternatively, the first uplink channel is one of at least one PUCCH for PUCCH resources configured by higher layer signaling, for example, the first uplink channel is one PUCCH of at least one PUCCH configured by higher layer signaling multi-CSI-PUCCH-ResourceList or PUCCH-CSI-ResourceList.

On the basis of the above embodiments, the implementation scheme in the specific application process of the information transmission method will be described in detail through several specific embodiments in combination with the accompanying drawings.

Embodiment 1

When a first PUCCH overlaps with multiple second PUCCHs in a time domain, where the priority of the first PUCCH is the same as that of the second PUCCHs and the multiple second PUCCHs do not overlap each other, that is, the multiple second PUCCHs belong to different sub time units, if the multiple second PUCCHs include at least one third PUCCH and the third PUCCH has corresponding DCI, that is, ACK/NACK information carried in the third PUCCH is scheduled/triggered by the DCI, then the terminal device determines, according to the at least one third PUCCH, a fourth PUCCH that meets a timing constraint of multiplexing, or determines a sub time unit where the fourth PUCCH is located. The fourth PUCCH may be the first PUCCH of the at least one third PUCCH that meets the timing constraint of multiplexing.

Further, for one third PUCCH, determining whether the third PUCCH meets the timing constraint of multiplexing, including: a time interval between a target start position and a first downlink channel being not less than a first value, where the target start position is the earliest start symbol between the third PUCCH and the first PUCCH, and ACK/NACK information corresponding to the first downlink channel is transmitted through the third PUCCH. The first downlink channel may be a PDSCH or a PDCCH.

The terminal device determines the number of bits of UCI for multiplex transmission, which includes the number of bits of information carried in the first PUCCH and the number of bits of information carried in the fourth PUCCH.

The terminal device determines a fifth PUCCH according to the number of bits of the UCI for multiplex transmission and a value indicated by an information field of a PRI indicated in the last DCI corresponding to the fourth PUCCH.

The terminal device uses the fifth PUCCH to transmit feedback information, which includes the information carried in the fourth PUCCH and part or all of the information carried in the first PUCCH.

According to the above technical solution, the channel for multiplex transmission can be limited to one second PUCCH, that is, a sub-slot, to avoid multiplexing ACK/NACK information on multiple PUCCHs to the same PUCCH for transmission, so that the feedback delay can be reduced and/or the reliability of data transmission can be improved.

Further, if there is no fourth PUCCH that meets the timing constraint of multiplexing, the terminal device transmits the multiple second PUCCHs without transmitting the first PUCCH. According to the technical solution, the terminal device can automatically abandon transmitting CSI information that has a relatively small impact on performance, so as to ensure the reliable transmission of ACK/NACK information without excessive limitation on the scheduling of the network device.

Figure 7:
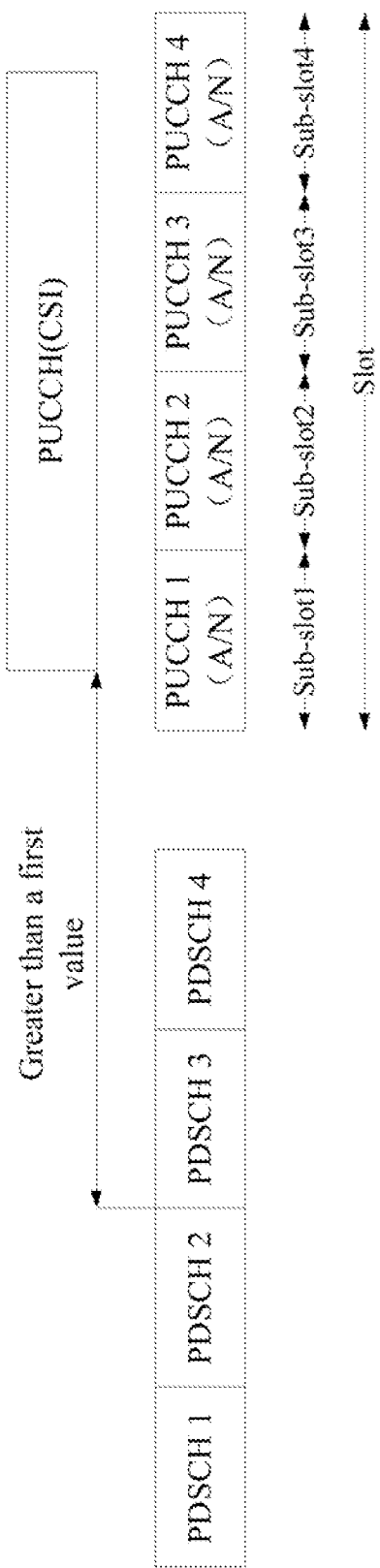
FIG. 7 is a schematic diagram of a third embodiment of an information transmission method according to an embodiment of the present application.

FIG. 7 is a schematic flowchart of a specific implementation of Embodiment 1. Description will be made hereunder to Embodiment 1 in detail in combination with FIG. 7.

As shown in FIG. 7, a PUCCH (i.e., the first PUCCH) transmitting CSI overlaps with four PUCCHs (i.e., the second PUCCHs) transmitting ACK/NACK in the time domain. PUCCH 1 is used to carry ACK/NACK information corresponding to an SPS PDSCH, that is, PUCCH 1 has no corresponding DCI information, so PUCCH 1 does not belong to the third PUCCH. PUCCH 2, PUCCH 3 and PUCCH 4 are respectively used to carry ACK/NACK information corresponding to dynamic schedule PDSCH 2, PDSCH 3 and PDSCH 4, that is, PUCCHs 2, 3 and 4 belong to the third PUCCH.

The terminal device determines that PUCCH 2 meets the timing constraint, that is, between the end position of PDSCH 2 and the start position of the first PUCCH (the earliest start position taken between the first PUCCH and PUCCH 2) is greater than the first value.

The terminal device determines to transmit ACK/NACK information corresponding to CSI and PDSCH 2 through a PUCCH (i.e. the fifth PUCCH) in sub-slot 2 (i.e. the time domain sub unit where PUCCH 2 is located).

If PUCCH 2, PUCCH 3 and PUCCH 4 do not meet the timing constraint of multiplexing, the terminal device transmits PUCCH 1, PUCCH 2, PUCCH 3 and PUCCH 4 without transmitting the first PUCCH.

Embodiment 2

When a first PUCCH overlaps with multiple second PUCCHs in a time domain, where the priority of the first PUCCH is the same as that of the second PUCCHs, the multiple second PUCCHs do not overlap each other, that is, the multiple second PUCCHs belong to different sub time units, the multiple second PUCCHs do not include a third PUCCH, and the third PUCCH has corresponding DCI, that is, ACK/NACK information carried in the third PUCCH is scheduled/triggered by DCI, if the multiple second PUCCHs and the first PUCCH meet a timing constraint of multiplexing, then transmit the information carried by the multiple second PUCCHs and part or all of the information carried by the first PUCCH through a sixth PUCCH.

According to the technical solution, since it cannot be guaranteed that PUCCHs selected for multiplex transmission belong to the same sub-slot, multiplexing all the UCI to one PUCCH such as a slot based PUCCH for transmission can avoid the missing of UCI information, and thus can improve the transmission reliability of the communication system.

Further, the sixth PUCCH is a PUCCH configured for the terminal device to transmit first information, where: the first PUCCH is configured to transmit the first information; the first information is CSI information; the sixth PUCCH is one of at least one PUCCH configured through higher layer signaling multi-CSI-PUCCH-Resourcelist or pucch-CSI-Resourcelist; or the sixth PUCCH is the first PUCCH.

The timing constraint includes that time intervals from end positions of downlink channels corresponding to the multiple second PUCCHs to the earliest start symbol among the multiple second PUCCHs and the first PUCCH are not less than a first value.

At this time, since it cannot be guaranteed that PUCCHs selected for multiplex transmission belong to one sub-slot, multiplexing all the UCI information to one PUCCH for transmission can avoid the missing of UCI information and improve the performance and reliability of the communication system.

Further, if the multiple second PUCCHs and the first PUCCH do not meet the timing constraint of multiplexing, transmit the multiple second PUCCHs without transmitting the first PUCCH. According to the technical solution, the terminal device may initiatively abandon transmitting CSI information that has a relatively small impact on performance, so as to ensure the reliable transmission of ACK/NACK information without excessive limitations on the base station scheduling.

Figure 8:
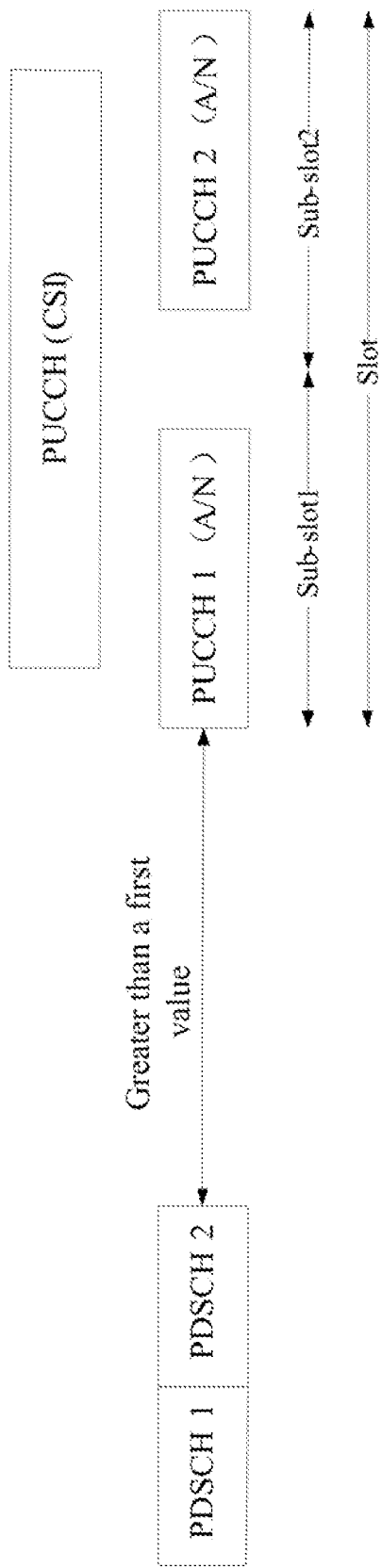
FIG. 8 is a schematic diagram of a fourth embodiment of an information transmission method according to an embodiment of the present application.

FIG. 8 is a schematic flowchart of a specific implementation of Embodiment 2. Description will be made hereunder to Embodiment 2 in detail in combination with FIG. 8.

Referring to FIG. 8, as shown in FIG. 8, a PUCCH transmitting CSI (the first PUCCH) overlaps with 2 PUCCHs transmitting ACK/NACK (the second PUCCHs). PUCCH 1 and PUCCH 2 are used to carry ACK/NACK information corresponding to an SPS PDSCH, that is, PUCCH 1 and PUCCH 2 have no corresponding DCI information. Therefore, PUCCH 1 and PUCCH 2 do not belong to the third PUCCH. PUCCH 1, PUCCH 2 and the first PUCCH meet a timing constraint of multiplexing, and the terminal device transmits part or all of CSI information and ACK/NACK information carried in PUCCH 1 and PUCCH 2 through the first PUCCH.

If PUCCH 1, PUCCH 2 and the first PUCCH do not meet the timing constraint of multiplexing, the terminal device transmits PUCCH 1 and PUCCH 2 without transmitting the first PUCCH.

In addition, in other exemplary embodiments of the present application, an information transmission method is also provided. The information transmission method is applied to a network device. The method includes:

when a first uplink channel overlaps with multiple second uplink channels in a time domain and the multiple second uplink channels include at least one third uplink channel, receiving first uplink information through a fifth uplink channel if the at least one third uplink channel includes a fourth uplink channel, where the third uplink channel corresponds to at least one downlink control signaling DCI, the fourth uplink channel and the first uplink channel meet a first timing constraint, the fifth uplink channel has a first relationship with the fourth uplink channel, and the multiple second uplink channels do not overlap each other in time domain.

In some example embodiments of the present application, the method further includes:

receiving information from the multiple second uplink channels if the at least one third uplink channel does not include the fourth uplink channel.

In some example embodiments of the present application, the fourth uplink channel is a channel of the at least one third uplink channel that meets the first timing constraint and has the earliest start time.

In some example embodiments of the present application, the first timing constraint includes: a time interval between a target start position and a first downlink channel being not less than a first value, where the target start position is the earliest start position between the third uplink channel and the first uplink channel, and uplink information corresponding to the first downlink channel is transmitted through the third uplink channel.

In some example embodiments of the present application, the first relationship includes one or more of the following relationships: the fifth uplink channel and the fourth uplink channel belong to the same time unit; the fifth uplink channel and the fourth uplink channel are determined according to the first DCI.

In some example embodiments of the present application, the fifth uplink channel is determined according to the first DCI and the number of bits of the first uplink information, where the number of bits of the first uplink information includes the number of bits of uplink information carried in the first uplink channel and the number of bits of uplink information carried in the fourth uplink channel.

In some example embodiments of the present application, the fourth uplink channel is determined according to the first DCI and the number of bits of uplink information carried in the fourth uplink channel.

In some example embodiments of the present application, the first DCI is the last DCI of at least one DCI corresponding to the fourth uplink channel.

In some example embodiments of the present application, the first uplink information includes: part or all of uplink information carried in the fourth uplink channel; or part or all of uplink information carried in the fourth uplink channel and part or all of uplink information carried in the first uplink channel.

In some example embodiments of the present application, the third uplink channel corresponding to at least one DCI includes: the at least one DCI being used to trigger the third uplink channel for transmission; or, the at least one DCI being used to schedule the third uplink channel for transmission; or, the at least one DCI being used to indicate a resource of the third uplink channel.

In some example embodiments of the present application, the time unit is one of a slot, a sub-slot, and at least one time domain symbol.

In some example embodiments of the present application, based on the above scheme, the first uplink channel is a PUCCH for transmitting CSI or a PUCCH for transmitting an SR; or, the first uplink channel has no corresponding DCI; or, the first uplink channel is configured by higher layer signaling.

In some example embodiments of the present application, the second uplink channel is a PUCCH for transmitting ACK/NACK information.

Since the information transmission method at the network device end is similar to the above information transmission method at the terminal device end in terms of implementation principles and technical effects, description will be omitted here for the sake of redundancy.

In addition, another information transmission method is also provided in other example embodiments of the present application. The information transmission method is applied to a network device, including:

when a first uplink channel overlaps with multiple second uplink channels in a time domain and the multiple second uplink channels are configured by higher layer signaling, receiving second uplink information through a sixth uplink channel if the first uplink channel and the multiple second uplink channels meet a second timing constraint; or receiving information from the multiple second uplink channels if the first uplink channel and the multiple second uplink channels do not meet the second timing constraint, where the multiple second uplink channels do not overlap each other in the time domain.

In some example embodiments of the present application, the second timing constraint includes: a time interval between a target start position and multiple second downlink channels being not less than a first value, where the target start position is the earliest start position among the first uplink channel and the multiple second uplink channels, and uplink information corresponding to the second downlink channel is transmitted through the second uplink channel.

In some example embodiments of the present application, the sixth uplink channel is configured to transmit third uplink information, and the first uplink channel is configured to transmit the third uplink information.

In some example embodiments of the present application, the sixth uplink channel is one of physical uplink control channel PUCCH resources configured by higher layer signaling, or, the first uplink channel is one of PUCCH resources configured by higher layer signaling.

In some example embodiments of the present application, based on the above scheme, the first uplink channel is a PUCCH for transmitting CSI or an SR; alternatively, the first uplink channel has no corresponding DCI; alternatively, the first uplink channel is configured by higher layer signaling.

In some example embodiments of the present application, the second uplink channel is a PUCCH for transmitting ACK/NACK information, and the second uplink information includes part or all of information carried by the first uplink channel and information carried by the multiple second uplink channels.

Figure 9:
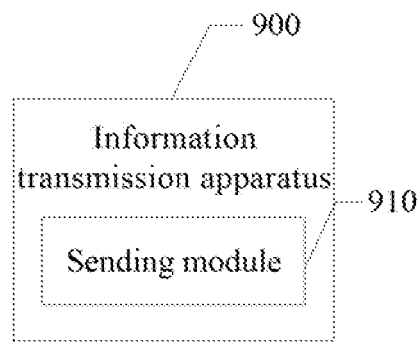
FIG. 9 is a schematic structural diagram of a first embodiment of an information transmission apparatus according to an embodiment of the present application.

FIG. 9 is a schematic structural diagram of a first embodiment of an information transmission apparatus according to an embodiment of the present application. As shown in FIG. 9, the information transmission apparatus 900 applied to a terminal device includes:

a sending module 910 configured to, when a first uplink channel overlaps with multiple second uplink channels in a time domain and the multiple second uplink channels include at least one third uplink channel, transmit first uplink information through a fifth uplink channel if the at least one third uplink channel includes a fourth uplink channel, where the third uplink channel corresponds to at least one downlink control signaling DCI, the fourth uplink channel and the first uplink channel meet a first timing constraint, the fifth uplink channel and the fourth uplink channel have a first relationship, and the multiple second uplink channels do not overlap each other in the time domain.

In some example embodiments of the present application, the sending module 910 is configured to:

transmit the multiple second uplink channels if the at least one third uplink channel does not include the fourth uplink channel.

In some example embodiments of the present application, the fourth uplink channel is a channel of the at least one third uplink channel that meets the first timing constraint and has the earliest start time.

In some example embodiments of the present application, the first timing constraint includes: a time interval between a target start position and a first downlink channel being not less than a first value, where the target start position is the earliest start position between the third uplink channel and the first uplink channel, and uplink information corresponding to the first downlink channel is transmitted through the third uplink channel.

In some example embodiments of the present application, the first relationship includes one or more of the following:
the fifth uplink channel and the fourth uplink channel occupy the same time unit;
the fifth uplink channel and the fourth uplink channel correspond to first DCI.

In some example embodiments of the present application, the fifth uplink channel is determined according to the first DCI and the number of bits of the first uplink information, where the number of bits of the first uplink information includes the number of bits of uplink information carried in the first uplink channel and the number of bits of uplink information carried in the fourth uplink channel.

In some example embodiments of the present application, the fourth uplink channel is determined according to the first DCI and the number of bits of uplink information carried in the fourth uplink channel.

In some example embodiments of the present application, the first DCI is the last DCI of at least one DCI corresponding to the fourth uplink channel.

In some example embodiments of the present application, the first uplink information includes:
part or all of uplink information carried in the fourth uplink channel; or,
part or all of uplink information carried in the fourth uplink channel and part or all of uplink information carried in the first uplink channel.

In some example embodiments of the present application, the third uplink channel corresponding to at least one DCI includes: the at least one DCI being used to trigger the third uplink channel for transmission; or, the at least one DCI being used to schedule the third uplink channel for transmission; or, the at least one DCI being used to indicate a resource of the third uplink channel.

In some example embodiments of the present application, the time unit is one of a slot, a sub-slot, and at least one time domain symbol.

In some example embodiments of the present application, the first uplink channel is a PUCCH for transmitting CSI or an SR; alternatively, the first uplink channel has no corresponding DCI; alternatively, the first uplink channel is configured by higher layer signaling.

In some example embodiments of the present application, the second uplink channel is a PUCCH for transmitting ACK/NACK information, and the second uplink information includes part or all of information carried by the first uplink channel and information carried by the multiple second uplink channels.

The information transmission apparatus provided in this embodiment is used to execute the technical solution on the side of the terminal device in any of the above method embodiments; and implementation principles and technical effects therebetween are similar, which will not be repeated here.

Figure 10:
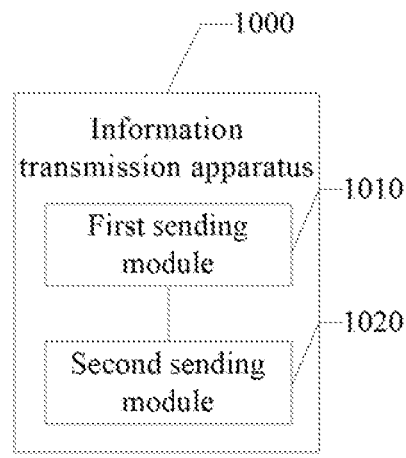
FIG. 10 is a schematic structural diagram of a second embodiment of an information transmission apparatus according to an embodiment of the present application.

FIG. 10 is a schematic structural diagram of a second embodiment of an information transmission apparatus according to an embodiment of the present application. As shown in FIG. 10, the information transmission apparatus 1000 applied to a terminal device includes:
a first sending module 1010 configured to, when a first uplink channel overlaps with multiple second uplink channels in a time domain and the multiple second uplink channels are configured by higher layer signaling, transmit second uplink information through a sixth uplink channel if the first uplink channel and the multiple second uplink channels meet a second timing constraint; or,
a second sending module 1020 configured to transmit the multiple second uplink channels if the first uplink channel and the multiple second uplink channels do not meet the second timing constraint, where the multiple second uplink channels do not overlap each other in the time domain.

In some example embodiments of the present application, the second timing constraint includes: a time interval between a target start position and multiple second downlink channels being not less than a first value, where the target start position is the earliest start position between the first uplink channel and the multiple second uplink channels, and uplink information corresponding to the second downlink channel is transmitted through the second uplink channel.

In some example embodiments of the present application, the sixth uplink channel is configured to transmit third uplink information, and the first uplink channel is configured to transmit the third uplink information.

In some example embodiments of the present application, the sixth uplink channel is one of at least one PUCCH for physical uplink control channel PUCCH resources configured by higher layer signaling; or, the first uplink channel is one of at least one PUCCH for PUCCH resources configured by higher layer signaling.

In some example embodiments of the present application, the first uplink channel is a PUCCH for transmitting CSI or an SR; alternatively, the first uplink channel has no corresponding DCI; alternatively, the first uplink channel is configured by higher layer signaling.

In some example embodiments of the present application, the second uplink channel is a PUCCH for transmitting ACK/NACK information.

The information transmission apparatus provided in this embodiment is used to execute the technical solution on the side of the terminal device in any of the above method embodiments; implementation principles and technical effects therebetween are similar, which will not be repeated here.

Figure 11:
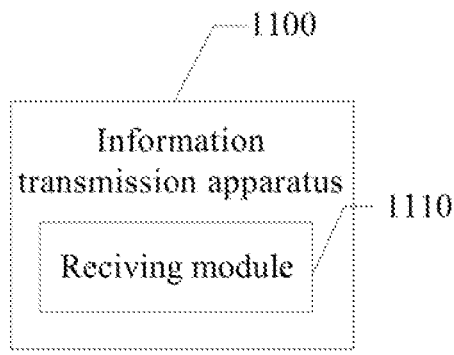
FIG. 11 is a schematic structural diagram of a third embodiment of an information transmission apparatus according to some embodiments of the present application.

FIG. 11 is a schematic structural diagram of a third embodiment of an information transmission apparatus according to an embodiment of the present application. As shown in FIG. 11, the information transmission apparatus 1100 applied to a network device includes:
a receiving module 1110 configured to, when a first uplink channel and multiple second uplink channels overlap in a time domain and the multiple second uplink channels include at least one third uplink channel, receive first uplink information through a fifth uplink channel if the at least one third uplink channel includes a fourth uplink channel,
where the third uplink channel corresponds to at least one downlink control signaling DCI, the fourth uplink channel and the first uplink channel meet a first timing constraint, the fifth uplink channel and the fourth uplink channel have a first relationship, and the multiple second uplink channels do not overlap each other in the time domain.

In some example embodiments of the present application, the receiving module 1110 is configured to:
if the at least one third uplink channel does not include the fourth uplink channel, receive information from the multiple second uplink channels.

In some example embodiments of the present application, the fourth uplink channel is a channel of the at least one third uplink channel that meets the first timing constraint and has the earliest start time.

In some example embodiments of the present application, the first timing constraint includes: a time interval between a target start position and a first downlink channel being not less than a first value, where the target start position is the earliest start position between the third uplink channel and the first uplink channel, and uplink information corresponding to the first downlink channel is transmitted through the third uplink channel.

In some example embodiments of the present application, the first relationship includes one or more of the following relationships: the fifth uplink channel and the fourth uplink channel belong to the same time unit; the fifth uplink channel and the fourth uplink channel are determined according to the first DCI.

In some example embodiments of the present application, the fifth uplink channel is determined according to the first DCI and the number of bits of the first uplink information, where the number of bits of the first uplink information includes the number of bits of uplink information carried in the first uplink channel and the number of bits of uplink information carried in the fourth uplink channel.

In some example embodiments of the present application, the fourth uplink channel is determined according to the first DCI and the number of bits of uplink information carried in the fourth uplink channel.

In some example embodiments of the present application, the first DCI is the last DCI of at least one DC corresponding to the fourth uplink channel.

In some example embodiments of the present application, the first uplink information includes: part or all of uplink information carried in the fourth uplink channel; or part or all of uplink information carried in the fourth uplink channel and part or all of uplink information carried in the first uplink channel can be described.

In some example embodiments of the present application, the third uplink channel corresponding to at least one DCI includes: the at least one DCI being used to trigger the third uplink channel for transmission; alternatively, the at least one DCI being used to schedule the third uplink channel for transmission; alternatively, the at least one DC being used to indicate a resource of the third uplink channel.

In some example embodiments of the present application, the time unit is one of a slot, a sub-slot, and at least one time domain symbol.

In some example embodiments of the present application, the first uplink channel is a PUCCH for transmitting CSI or an SR; alternatively, the first uplink channel has no corresponding DCI; alternatively, the first uplink channel is configured by higher layer signaling.

In some example embodiments of the present application, the second uplink channel is a PUCCH for transmitting ACK/NACK information.

The information transmission apparatus provided in this embodiment is used to execute the technical solution on the network device side in any of the above method embodiments; implementation principles and technical effects therebetween are similar, which will not be repeated here.

In addition, another information transmission apparatus is provided in an example embodiment. The information transmission apparatus applied to a network device includes:

a receiving module configured to, when a first uplink channel and multiple second uplink channels overlap in a time domain and the multiple second uplink channels are configured by higher layer signaling, receive second uplink information through a sixth uplink channel if the first uplink channel and the multiple second uplink channels meet a second timing constraint; or receive information from the multiple second uplink channels if the first uplink channel and the multiple second uplink channels do not meet the second timing constraint, where the multiple second uplink channels do not overlap each other in the time domain.

In some example embodiments of the present application, the second timing constraint includes: a time interval between a target start position and multiple second downlink channels being not less than a first value, where the target start position is the earliest start position among the first uplink channel and the multiple second uplink channels, and uplink information corresponding to the second downlink channel is transmitted through the second uplink channel.

In some example embodiments of the present application, the sixth uplink channel is configured to transmit third uplink information, and the first uplink channel is configured to transmit the third uplink information.

In some example embodiments of the present application, the sixth uplink channel is one of at least one PUCCH for physical uplink control channel PUCCH resources configured by higher layer signaling, or the first uplink channel is one of at least one PUCCH for PUCCH resources configured by higher layer signaling.

In some example embodiments of the present application, the first uplink channel is a PUCCH for transmitting CSI or an SR; alternatively, the first uplink channel has no corresponding DCI; alternatively, the first uplink channel is configured by higher layer signaling.

In some example embodiments of the present application, based on the above scheme, the second uplink channel is a PUCCH for transmitting ACK/NACK information.

The information transmission apparatus provided in this embodiment is used to execute the technical solution on the network device side in any of the above method embodiments; implementation principles and technical effects therebetween are similar, which will not be repeated here.

Figure 12:
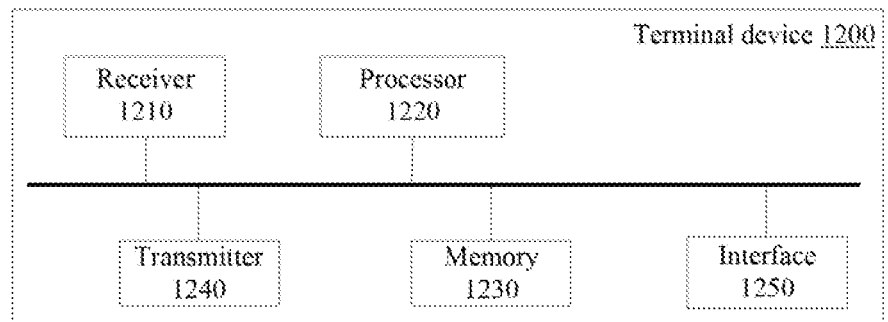
FIG. 12 is a schematic structural diagram of a first embodiment of a terminal device according to an embodiment of the present application.

FIG. 12 is a schematic structural diagram of a first embodiment of a terminal device according to an embodiment of the present application. As shown in FIG. 12, the terminal device 1200 includes:

a processor 1220, a memory 1230, a transmitter 1240, and an interface 1250 for communication with a network device; in an implementation, the terminal device 1200 also includes a receiver 1210, where the memory 1230 stores computer-executable instructions;

the processor 1220 executes the computer-executable instructions stored in the memory, so that the processor 1220 executes the technical solution on the terminal device side in any of the method embodiments described above.

Figure 13:
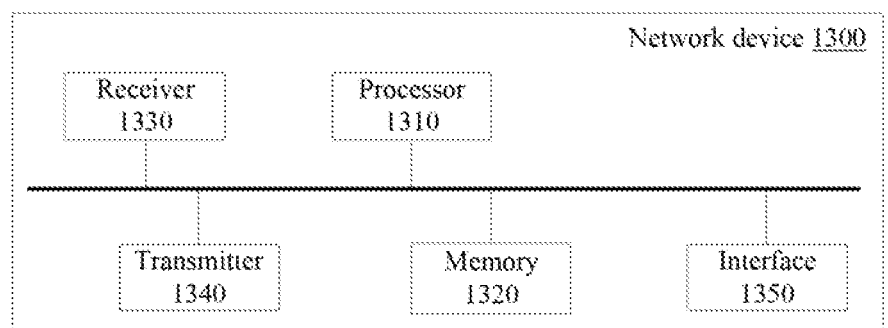
FIG. 13 is a schematic structural diagram of a first embodiment of a network device according to an embodiment of the present application.

FIG. 13 is a schematic structural diagram of a first embodiment of a network device according to an embodiment of the present application. As shown in FIG. 13, the network device 1300 includes:

a processor 1310, a memory 1320, a receiver 1330, an interface 1350 for communication with a terminal device; in an implementation, the network device 1300 also includes a transmitter 1340;

the memory 1320 stores computer-executable instructions;

the processor 1310 executes the computer-executable instructions stored in the memory, so that the processor 1310 executes technical solutions on the network device side in any of the method embodiments described above.

The present application also provides a computer-readable storage medium. Computer-executable instructions are stored in the computer-readable storage medium, and the computer-executable instructions, when executed by a processor, are used to implement the technical solution on the network device side in any of the method embodiments described above.

The present application also provides a computer-readable storage medium. Computer-executable instructions are stored in the computer-readable storage medium, and the computer-executable instructions, when executed by a processor, are used to implement the technical solution on the terminal device side in any of the above method embodiments.

The present application also provides a program for executing the technical solution on the network device side in the above method embodiments when the program is executed by a processor.

The present application also provides a program for executing the technical solution on the terminal device side in the above method embodiments when the program is executed by a processor.

The present application also provides a computer program product, including program instructions for implementing the technical solution on the network device side in the above method embodiments.

The present application also provides a computer program product, including program instructions for implementing the technical solution on the terminal device side in the above method embodiments.

The present application also provides a chip, including a processing module and a communication interface, where the processing module can execute the technical solution on the network device side in the above method embodiments.

Further, the chip further includes a storage module (e.g., a memory). The storage module is configured to store instructions, the processing module is configured to execute the instructions stored in the storage module, and the execution of the instructions stored in the storage module causes the processing module to execute the technical solution on the network device side.

The present application also provides a chip, including a processing module and a communication interface, where the processing module can execute the technical solution of the terminal device in the above method embodiments.

Further, the chip further includes a storage module (e.g., a memory). The storage module is configured to store instructions, the processing module is configured to execute the instructions stored in the storage module, and the execution of the instructions stored in the storage module causes the processing module to execute the technical solution on the terminal device side.

In several of the embodiments provided in the present application, it should be understood that the disclosed systems, apparatuses, and methods may be implemented in other ways. For example, the apparatus embodiments described above are only schematic, for example, the division of units is only a logical function division, and there may be other ways of division in the actual implementation, for example, multiple units or components can be combined or integrated into another system, or some features can be ignored or not executed. On the other hand, the coupling or direct coupling or communication connection shown or discussed can be indirect coupling or communication connection through some interfaces, apparatuses or units, and can be electrical, mechanical, or other forms.

In the specific implementations of the above network device and terminal device, it should be understood that the processor can be a central processing unit (CPU), other general purpose processor, a digital signal processor (DSP), an application specific integrated circuit (ASIC), and etc. The general purpose processor can be a microprocessor or any conventional processor. The steps of the methods disclosed in conjunction with the present application may be directly embodied as being executed by a hardware processor or by a combination of hardware and software modules in the processor.

All or part of the steps to implement the above method embodiments can be accomplished by the hardware associated with the program instructions. The program described above can be stored in a readable memory. When the program is executed, the steps included in the above-mentioned method embodiments are executed; the aforementioned memory (the storage medium) includes: a read-only memory (ROM), a random access memory (RAM), a flash memory, a hard disk, a solid state hard disk, a tape, a floppy disk, an optical disk and any combination thereof.

What is claimed is:

1. An information transmission method applied to a terminal device, the method comprises:

when a first uplink channel and multiple second uplink channels overlap in a time domain and the multiple second uplink channels comprise at least one third uplink channel, transmitting first uplink information through a fifth uplink channel if the at least one third uplink channel comprises a fourth uplink channel, wherein the third uplink channel corresponds to at least one downlink control information (DCI), the fourth uplink channel and the first uplink channel meet a first timing constraint, the fifth uplink channel has a first relationship with the fourth uplink channel, and the multiple second uplink channels do not overlap each other in the time domain;

wherein the first timing constraint comprises: a time interval between a target start position and a first downlink channel being not less than a first value, wherein the target start position is an earliest start position between the third uplink channel and the first uplink channel, and uplink information corresponding to the first downlink channel is transmitted through the third uplink channel;

wherein the first relationship comprises one or more of the following relationships:

the fifth uplink channel and the fourth uplink channel occupy a same time unit; and the fifth uplink channel and the fourth uplink channel correspond to first DCI.

2. The method according to claim 1, wherein the fourth uplink channel is a channel of the at least one third uplink channel that meets the first timing constraint and has an earliest start time.

3. The method according to claim 1, wherein the third uplink channel corresponds to at least one DCI, comprising:

the at least one DCI being used to trigger the third uplink channel for transmission; or, the at least one DCI being used to schedule the third uplink channel for transmission; or, the at least one DCI being used to indicate a resource of the third uplink channel.

4. The method according to claim 1, wherein the time unit is one of a slot, a sub-slot, and at least one time-domain symbol.

5. The method according to claim 1, wherein the first uplink channel is a physical uplink control channel (PUCCH) for transmitting channel state information (CSI) or a scheduling request (SR); or, the first uplink channel has no corresponding DCI; or, the first uplink channel is configured by higher layer signaling.

6. The method according to claim 1, wherein the second uplink channel is a physical uplink control channel (PUCCH) for transmitting acknowledgment/negative acknowledgment (ACK/NACK) information.

7. A terminal device, comprising:

a processor, a memory, a transmitter, and an interface for communication with a network device;

wherein the memory stores computer-executable instructions;

the processor executes the computer-executable instructions stored in the memory, so that the processor executes the information transmission method of claim 1.

8. An information transmission method applied to a terminal device, the method further comprising:
- when a first uplink channel and multiple second uplink channels overlap in a time domain and the multiple second uplink channels are configured by higher layer signaling,
- transmitting second uplink information through a sixth uplink channel if the first uplink channel and the multiple second uplink channels meet a second timing constraint; or,
- transmitting the multiple second uplink channels if the first uplink channel and the multiple second uplink channels do not meet the second timing constraint,
- wherein the multiple second uplink channels do not overlap each other in the time domain;
- wherein the second timing constraint comprises: a time interval between a target start position and multiple second downlink channels being not less than a first value, wherein the target start position is an earliest start position among the first uplink channel and the multiple second uplink channels, and uplink information corresponding to the second downlink channel is transmitted through the second uplink channel.

9. The method according to claim 8, wherein the sixth uplink channel is configured to transmit third uplink information, and the first uplink channel is configured to transmit the third uplink information.

10. The method according to claim 8, wherein:
- the sixth uplink channel is one of physical uplink control channel (PUCCH) resources configured by higher layer signaling; or
- the first uplink channel is one of PUCCH resources configured by higher layer signaling.

11. The method according to claim 8, wherein:
- the first uplink channel is a PUCCH for transmitting channel state information (CSI) or a scheduling request (SR); or,
- the first uplink channel has no corresponding DCI; or,
- the first uplink channel is configured by higher layer signaling.

12. The method according to claim 8, wherein the second uplink channel is a PUCCH for transmitting ACK/NACK information, and the second uplink information comprises part or all of information carried by the first uplink channel and information carried by the multiple second uplink channels.

13. A terminal device, comprising:
- a processor, a memory, a transmitter, and an interface for communication with a network device;
- wherein the memory stores computer-executable instructions;
- the processor executes the computer-executable instructions stored in the memory, so that the processor executes the information transmission method of claim 8.

14. A non-transitory computer-readable storage medium, wherein computer-executable instructions are stored in the computer-readable storage medium, and the computer-executable instructions, when executed by a processor, are used to implement:
- when a first uplink channel and multiple second uplink channels overlap in a time domain and the multiple second uplink channels comprise at least one third uplink channel, transmitting first uplink information through a fifth uplink channel if the at least one third uplink channel comprises a fourth uplink channel,
- wherein the third uplink channel corresponds to at least one downlink control information (DCI), the fourth uplink channel and the first uplink channel meet a first timing constraint, the fifth uplink channel has a first relationship with the fourth uplink channel, and the multiple second uplink channels do not overlap each other in the time domain;
- wherein the first timing constraint comprises: a time interval between a target start position and a first downlink channel being not less than a first value, wherein the target start position is an earliest start position between the third uplink channel and the first uplink channel, and uplink information corresponding to the first downlink channel is transmitted through the third uplink channel;
- wherein the first relationship comprises one or more of the following relationships:
- the fifth uplink channel and the fourth uplink channel occupy a same time unit; and
- the fifth uplink channel and the fourth uplink channel correspond to first DCI.

15. The non-transitory computer-readable storage medium according to claim 14, wherein the fourth uplink channel is a channel of the at least one third uplink channel that meets the first timing constraint and has an earliest start time.

* * * * *